(12) United States Patent
Ansalone

(10) Patent No.: US 12,043,231 B2
(45) Date of Patent: Jul. 23, 2024

(54) HYDRAULIC ASSEMBLY, IN PARTICULAR FOR BRAKING SYSTEMS OR HYDRAULIC ACTUATING CIRCUITS OF DEVICES, IN THE MOTOR VEHICLE AND MOTORCYCLE SECTOR

(71) Applicant: BREMBO S.p.A., Curno (IT)

(72) Inventor: Marco Ansalone, Curno (IT)

(73) Assignee: Brembo S.p.A., Bergamo (IT)

( * ) Notice: Subject to any disclaimer, the term of this patent is extended or adjusted under 35 U.S.C. 154(b) by 107 days.

(21) Appl. No.: 17/757,779

(22) PCT Filed: Dec. 14, 2020

(86) PCT No.: PCT/IB2020/061893
§ 371 (c)(1),
(2) Date: Jun. 21, 2022

(87) PCT Pub. No.: WO2021/130597
PCT Pub. Date: Jul. 1, 2021

(65) Prior Publication Data
US 2024/0025390 A1 Jan. 25, 2024

(30) Foreign Application Priority Data

Dec. 23, 2019 (IT) .......................... 102019000025213

(51) Int. Cl.
*B60T 17/04* (2006.01)
*F16L 41/00* (2006.01)
(52) U.S. Cl.
CPC .......... *B60T 17/043* (2013.01); *F16L 41/005* (2013.01)
(58) Field of Classification Search
CPC ............................ F16L 41/005; B60T 17/043
See application file for complete search history.

(56) References Cited

U.S. PATENT DOCUMENTS

| 8,511,717 B2 | 8/2013 | Fulmer et al. |
| 2015/0136537 A1 | 5/2015 | Kaneko et al. |

FOREIGN PATENT DOCUMENTS

| DE | 3514315 A1 | 11/1985 |
| EP | 2864683 A1 | 4/2015 |

(Continued)

OTHER PUBLICATIONS

European Patent Office, International Search Report, issued in PCT/IB2020/061893, Mar. 11, 2021, Rijswijk, NL.

*Primary Examiner* — Zachary T Dragicevich
(74) *Attorney, Agent, or Firm* — Marshall & Melhorn, LLC

(57) ABSTRACT

A hydraulic assembly has a hydraulic unit having a hydraulic unit body, in which a delivery channel is formed, the hydraulic unit body having a hydraulic unit body base, in which an inlet mouth is formed. The hydraulic assembly has a connection having a feed pipe for receiving a hydraulic fluid and an eyelet for outputting the hydraulic fluid, the eyelet delimiting an eyelet hole and having an upper eyelet sealing surface and a lower eyelet sealing surface. The hydraulic assembly has a pipe union having a hollow cylindrical body for receiving the hydraulic fluid from the eyelet and introducing the hydraulic fluid into the delivery channel and a pipe union head, an upper gasket and a lower gasket. The connection has a shoulder having a lower projection not interfering with the lower gasket. The connection is coupled in a fail-proof manner to the hydraulic unit, preventing the hydraulic unit from rotating during assembly and use.

11 Claims, 6 Drawing Sheets

(56) References Cited

FOREIGN PATENT DOCUMENTS

| GB | 2158909 | A | * | 11/1985 | ............ | F16L 41/005 |
| GB | 2172357 | A | * | 9/1986 | ............ | F16L 41/005 |
| GB | 2491886 | A | * | 12/2012 | ............ | F16L 41/005 |
| JP | 2011006033 | A | | 1/2011 | | |
| WO | 2018150365 | A1 | | 8/2018 | | |

* cited by examiner

HYDRAULIC ASSEMBLY, IN PARTICULAR FOR BRAKING SYSTEMS OR HYDRAULIC ACTUATING CIRCUITS OF DEVICES, IN THE MOTOR VEHICLE AND MOTORCYCLE SECTOR

CROSS-REFERENCE TO RELATED APPLICATIONS

This application is a National Phase Application of PCT International Application No. PCT/IB2020/061893, having an International Filing Date of Dec. 14, 2020 which claims priority to Italian Application No. 102019000025213 filed Dec. 23, 2019, each of which is hereby incorporated by reference in its entirety.

FIELD OF THE INVENTION

The present invention relates to a hydraulic assembly, particularly, but not exclusively, for brake systems and/or clutch circuits, typically for automotive or motorcycle applications.

PRIOR ART

In hydraulic systems for actuating brakes and/or clutches, typically a plurality of hydraulic connections are employed which connect hydraulic system ducts to one another to convey a hydraulic fluid from, e.g. a hydraulic control unit, such as a master cylinder, to a hydraulic actuating unit, such as a brake caliper, a pressure plate of a clutch and the like.

The plurality of hydraulic connections between hydraulic units must be fluid-tight to avoid the presence of leaks which generate inefficiencies in the hydraulic system and not least malfunctions in the hydraulic system itself, endangering the system user, e.g. the motorcycle rider or the car driver.

Generally, the hydraulic connections comprise at least one connection having a delivery pipe and an eyelet, superimposed on a feed channel formed in a hydraulic unit, e.g. such as a brake caliper, an ABS manifold, or a clutch pressure plate, wherein the connection is fixed to the hydraulic unit by means of a union pipe coaxial to the eyelet and fixed to the hydraulic unit. e.g. by means of a nut-screw mechanism. To guarantee the hydraulic seal, there is a lower gasket and an upper gasket arranged respectively between the hydraulic unit and the eyelet, and between the eyelet and the union pipe. However, in some cases in the absence of one of the gaskets, the mechanical interaction between the eyelet and the hydraulic unit, or between the eyelet and the union pipe, may be sufficient to maintain the hydraulic seal between the components in the stages immediately following assembly, and therefore some faulty hydraulic assemblies may not be intercepted on the assembly line.

Document WO2018150365 by the applicant describes a hydraulic connector for a hydraulic unit configured to detect simply and effectively a possible failed assembly of at least one upper or lower gasket, thereby being able to intercept a faulty hydraulic assembly before it is sold or mounted on a respective vehicle. In particular, the suggested solution provides a hydraulic connector having a connection provided with an upper and/or lower projection having an axial thickness smaller than the axial thickness of the respective gasket so if the respective lower or upper gaskets are missing, the projection abuts against a base surface of the hydraulic unit and creates a gap, e.g. between the eyelet and a base surface of a hydraulic unit, from which hydraulic fluid may leak.

Such a solution teaches how to detect the missing assembly of a gasket between the hydraulic unit and the connection independently from the positioning between one and the other.

However, during the assembly of a hydraulic assembly, the correct positioning of the connection relative to the hydraulic unit is of crucial importance to ensure a safe and durable sealed connection without improper interactions when using the hydraulic connections with other elements of the vehicle once the hydraulic assembly has been mounted on the vehicle.

In the industry, there is a particularly strong response to the correct positioning between connections and hydraulic units, and consequently, there are conflicting needs to create a hydraulic assembly which is easy to assemble as quickly as possible, and which has a high level of safety, preventing tampering with the connection by external users or accidental movement of the connection connected to the hydraulic unit relative to the design position.

Document JP2011006033 describes a hydraulic connection configured to assist the assembly of the hydraulic connection to the respective supply duct formed in the hydraulic unit and to prevent rotations of the connection itself relative to the supply duct once the connection has been tightened to the hydraulic unit through the respective union pipe. Such a solution comprises providing the eyelet of the connection with a radially extending projection having a bent engagement end, wherein on the base surface the hydraulic unit provides a housing configured to accommodate the bent engagement end. Therefore, during assembly, once the bent end is inserted into the respective housing, the connection may rotate relative to a fixed axis defined by the housing, and an operator can rotate the connection until the eyelet is correctly superimposed over the feed channel of the hydraulic unit, and connect the connection to the hydraulic unit.

Such a solution, although satisfactory in some respects, has some disadvantages from the constructive point of view, in particular, such a projection is usually welded to the eyelet and plastically bent. Such a projection is constructively a weak point in the system which increases its fragility, consequently losing the ability to prevent the connection from rotating over time. However, in the case of hydraulic units provided with a plurality of hydraulic ports which can be associated with a plurality of connections having such a bent projection, the assembly of the hydraulic assembly could be particularly difficult, because it is not immediately apparent which housings are intended for which projections and for which inlet port a specific connection is intended.

Document U.S. Pat. No. 8,511,717 describes a manifold for ABS hydraulic units having a plurality of connection ports for respective connections, wherein each connection has a block shaped to achieve a positive coupling with at least one pair of adjacent blocks. In this manner, the assembly and positioning of the plurality of connections are guided by the external shapes of the block of each neighboring connection. Despite this solution being advantageous in some respects, the positioning of each block is dependent on the positioning of neighboring blocks, and thus it is possible that during assembly a user may make several attempts before finding the correct position of each block relative to the neighboring blocks. As a result, such a solution can slow down the assembly time and increase production costs.

However, it is worth noting that such a solution is functional for hydraulic units having a plurality of connections but loses its effectiveness in the presence of a hydraulic unit in which only one inlet port is provided, for example, in which the correct position of the connection is not automatically defined by the first nearby connections, because they are not present.

Therefore, the need is felt to devise a hydraulic assembly in which the correct positioning of the connection relative to the hydraulic unit can be easily identified and sustained over time.

Furthermore, the need is felt to devise a hydraulic assembly in which it is possible to reduce the assembly time between each connection and the corresponding hydraulic unit.

Furthermore, the need is felt for a hydraulic assembly which makes it possible to univocally define the correct position of each connection relative to the corresponding inlet port, preventing a rotation of the connection relative to the hydraulic unit both during assembly and during use, and optionally which also makes it possible to automatically detect the absence of a gasket before the sale or a successive assembly of the assembly to a respective vehicle.

Therefore, the problem underlying the present invention is to devise a hydraulic assembly, which has such structural and functional features as to satisfy the aforementioned requirements and, at the same time, solve the drawbacks mentioned with reference to the prior art and satisfy the aforesaid needs felt.

SOLUTION

It is an object of the present invention to provide a hydraulic assembly having at least one connection and a hydraulic unit which allows an easily identifiable, unambiguous positioning free of rotations between the connection and the hydraulic unit.

These and other objects and advantages are achieved by a device as described and claimed herein.

Some advantageous embodiments are the object of the dependent claims.

The suggested hydraulic assembly makes it possible to obtain a univocal coupling between the hydraulic connection and the hydraulic unit, preventing any rotation of the connection relative to its predetermined position either during assembly or during use.

The hydraulic assembly is particularly easy to manufacture cost-effectively.

The hydraulic assembly is also particularly robust relative to the known solutions and is tamper-resistant.

The hydraulic assembly according to the present invention does not impact the standard assembly arrangements, and can thus be easily implemented in the assembly line, furthermore the presence of welded or plastically deformed connecting elements is avoided.

From the analysis of this solution, it has emerged how the suggested solution makes it possible to obtain an error-proof assembly between connection and hydraulic unit, by virtue of the configuration and sizing of the connection and the hydraulic unit only one assembly position is allowed, wherein such a position is particularly stable and easily identifiable by an operator.

Furthermore, the suggested solutions make it possible to reduce the assembly time of the hydraulic assembly, avoiding possible positioning errors between the connection and the hydraulic unit.

Even further, by virtue of the suggested solutions, it is possible to intercept a hydraulic assembly lacking a bottom or top gasket before the assembly is destined for sale or is sent to a successive assembly line, e.g. to be mounted on a vehicle, without the addition of a further control on the assembly line.

Furthermore, by virtue of the suggested solutions, it is possible to guarantee an increase in breakage resistance.

FIGURE

Further features and advantages of the hydraulic assembly will be apparent from the description provided below of preferred embodiments thereof, given by way of non-limiting examples, with reference to the accompanying drawings, in which.

DESCRIPTION OF SOME PREFERRED EMBODIMENTS

Figure 1:
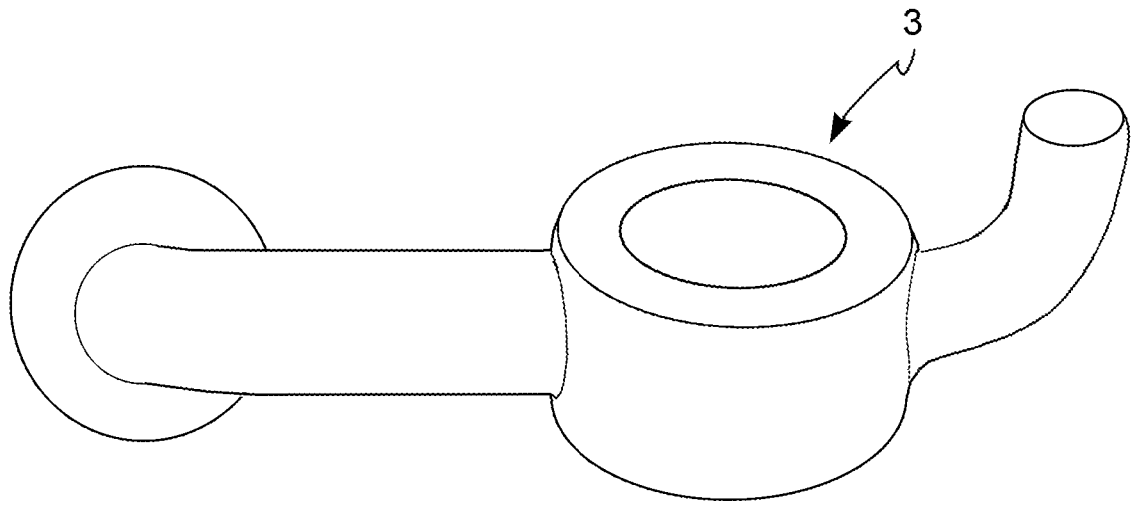
FIG. 1 is an axonometric view of a connection of a hydraulic assembly known in the prior art.
Figure 2:
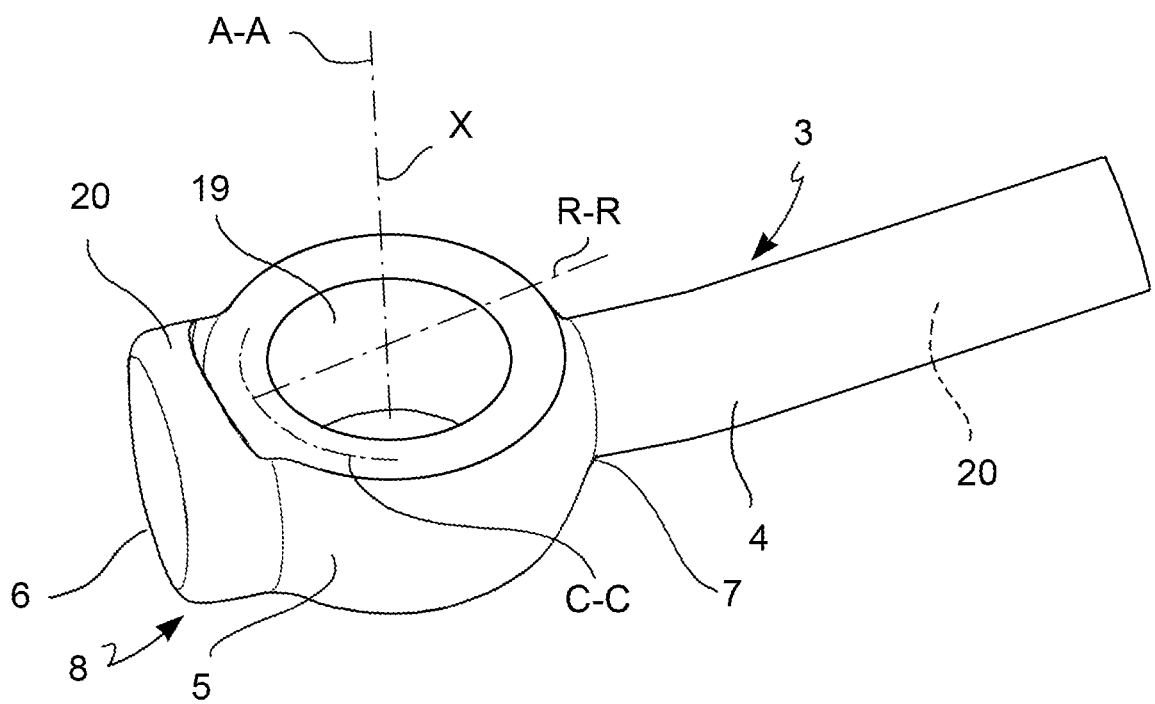
FIG. 2 is an axonometric view of a connection of a hydraulic assembly according to an embodiment of the present invention.
Figure 3:
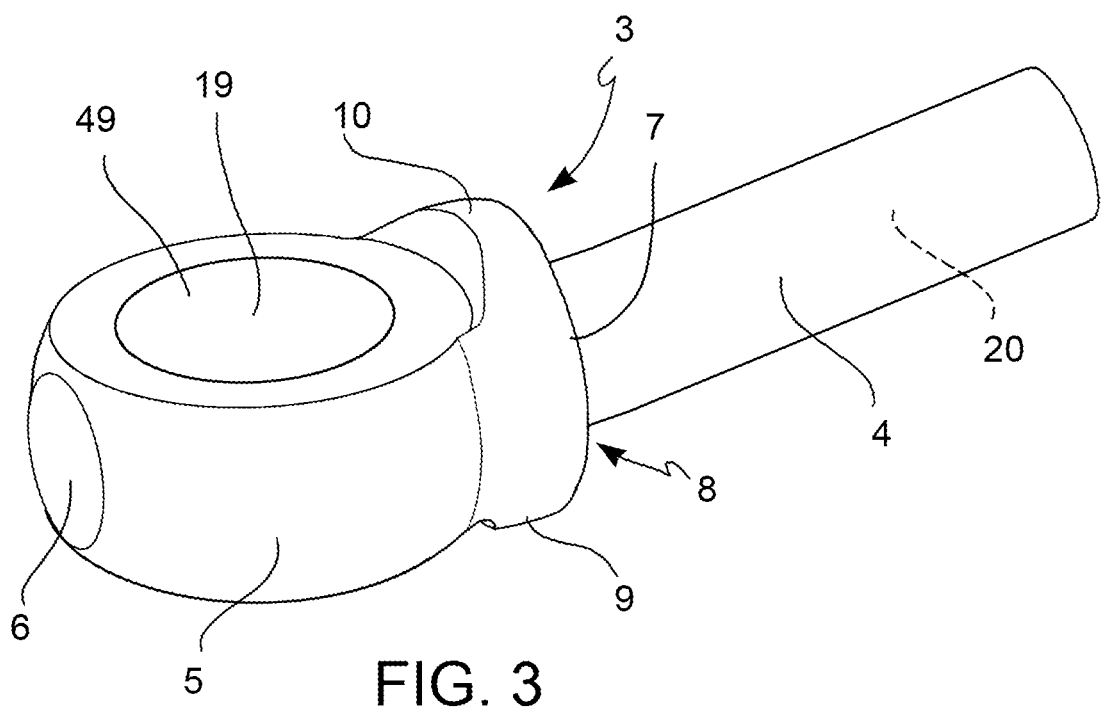
FIG. 3 is an axonometric view of a connection of a hydraulic assembly according to a further embodiment of the present invention.

A hydraulic assembly 1, in particular for braking and/or clutch actuation systems, for a braking system is provided according to a general embodiment. However, the use of the present invention 5 should be considered in a broad and non-restrictive sense, because it is applicable on all hydraulic connections and hydraulic units, preferably but not exclusively in the automotive sector, understood as the sector of motor vehicles and motorcycles, such as brake calipers, master cylinders, ABS control units, valves and the like.

Said hydraulic assembly 1 comprises a hydraulic unit 2 having a hydraulic unit body 27, in which said at least one delivery channel 12 is formed. The hydraulic unit body 27 comprises a hydraulic unit body base 28 in which an inlet port 29 of said delivery channel 12 is formed.

Said hydraulic assembly 1 further comprises at least one connection 3 provided with a feed pipe 4 adapted to receive an inlet hydraulic fluid, and an eyelet 5 adapted to output said fluid.

Said connection 3 may be obtained, for example, from a semi-finished product, by turning, milling or forging.

Said eyelet 5 delimits an eyelet hole 19 defining an eyelet axis X, which in turn defines an axial direction A-A, a radial direction R-R perpendicular to said axial direction A-A, and a circumferential direction C-C transverse to said axial direction A-A and said radial direction R-R.

The eyelet 5 comprises an eyelet upper sealing surface 32 and an eyelet lower sealing surface 33.

The feed pipe 4 is hollow to allow the transporting of pressurized fluid through a feed connection inner channel 20 in fluid communication with the eyelet.

The hydraulic assembly 1 further comprises at least one pipe union 11 having a hollow cylindrical body 13 and a pipe union head 21. The hollow cylindrical body 13 is configured to receive the hydraulic fluid from the eyelet 5 and to feed the hydraulic fluid into the delivery channel 12.

The pipe union 11 is coaxially arranged to the eyelet hole 19.

The hydraulic assembly 1 comprises at least one upper gasket 34 arranged between the eyelet upper sealing surface 32 and the pipe union head 21.

The upper gasket 34 is typically ring-shaped, e.g. made of annealed copper, fitted coaxially with the pipe union 11.

Said hydraulic assembly 1 comprises at least one lower gasket 35 arranged between said eyelet lower sealing surface 33 and said hydraulic unit body base 28.

The lower gasket 35 is typically ring-shaped, e.g. made of annealed copper, fitted coaxially with the pipe union 11.

In an assembly configuration, said lower gasket 35 and upper gasket 34 are axially compressed between the abutment surfaces of respective elements arranged axially above and below said elements.

Said connection 3 comprises at least one shoulder 8 which extends laterally, at least in the radial direction R-R, relative to said eyelet 5.

The shoulder 8 comprises a lower projection 9 which extends in the axial direction A-A to the side of said lower eyelet sealing surface 33 so as not to interfere with said lower gasket 35.

The hydraulic unit body base 28 comprises a cavity 31 configured to accommodate said lower projection 9 in a complementary manner, so that said at least one connection 3 is coupled in a fail-proof manner to said hydraulic unit 2, thus preventing it from rotating in a circumferential direction C-C both during assembly and use.

According to an embodiment, the cavity 31 has a cavity bottom surface 37 and a cavity lateral surface 38. The cavity lateral surface 38 is developed peripherally to the cavity bottom surface 37 at least along the axial direction A-A. The lower projection 9 is configured to abut with the cavity bottom surface 37 and at least one portion of the cavity lateral surface 38 prevents the connection 3 from moving along the radial direction R-R.

According to an embodiment, the lower projection 9 and the cavity 31 have a positive coupling so that during assembly of the connection 3 with the hydraulic unit 2 a stable connection position is defined, wherein said position defines a stable positioning in both circumferential direction C-C and radial direction R-R.

According to an embodiment, the cavity lateral surface 38 has a cavity radially inner portion 39 and a cavity radially outer portion 40.

According to an embodiment, said cavity radially inner portion 39 is flared to direct said lower projection 9 to said stable connection position.

According to an embodiment, in the stable connection position, the lower projection 9 abuts with the cavity radially outer portion 40 and with the cavity bottom surface 37.

According to an embodiment, the pipe union 11 comprises a pipe union radial duct 14 in fluid communication with the connection feed duct 20 and a pipe union axial duct 16 which is connected to the pipe union radial duct 14 and leads into the hydraulic unit body delivery channel 12.

According to an embodiment, the delivery channel 12 obtained in the hydraulic unit 2 is threaded, the pipe union 11 comprises a pipe union outer lateral wall 17 which has a pipe union thread 18, and threaded delivery channel 12 accommodates said pipe union thread 18.

According to an embodiment, the union pipe head 21 is opposite to the thread 18 and comprises at least one head collar 26.

According to an embodiment, not shown, the head collar 26 forms an undercut relative to the eyelet 5, resting in abutment against the eyelet upper sealing surface.

According to an embodiment, the union pipe head 21 comprises a profile adapted to facilitate screwing of the union pipe.

According to an embodiment, the eyelet 5 has an eyelet inner lateral wall 49 on which an eyelet opening 50 is obtained from which the connection feed inner channel 20 leads, wherein the eyelet opening 50 faces the union pipe radial duct 14 to allow the fluid connection between the feed pipe 20 and the hydraulic unit body delivery channel 12.

According to an embodiment, the union pipe 11 comprises a union pipe circular crown 22 formed on the union pipe outer lateral wall 17 onto which said union pipe radial duct 14 leads. The union pipe circular crown 22 is made in the form of a recess in the outer lateral wall 17.

According to an embodiment, said connection feed inner channel flows leads to said union pipe circular crown 22.

In this manner, it is not necessary to have a perfect radial correspondence between the opening of the eyelet and the union pipe radial duct, because the fluid flows into the circular crown and consequently into the radial duct facing the respective circular crown.

Figure 7:
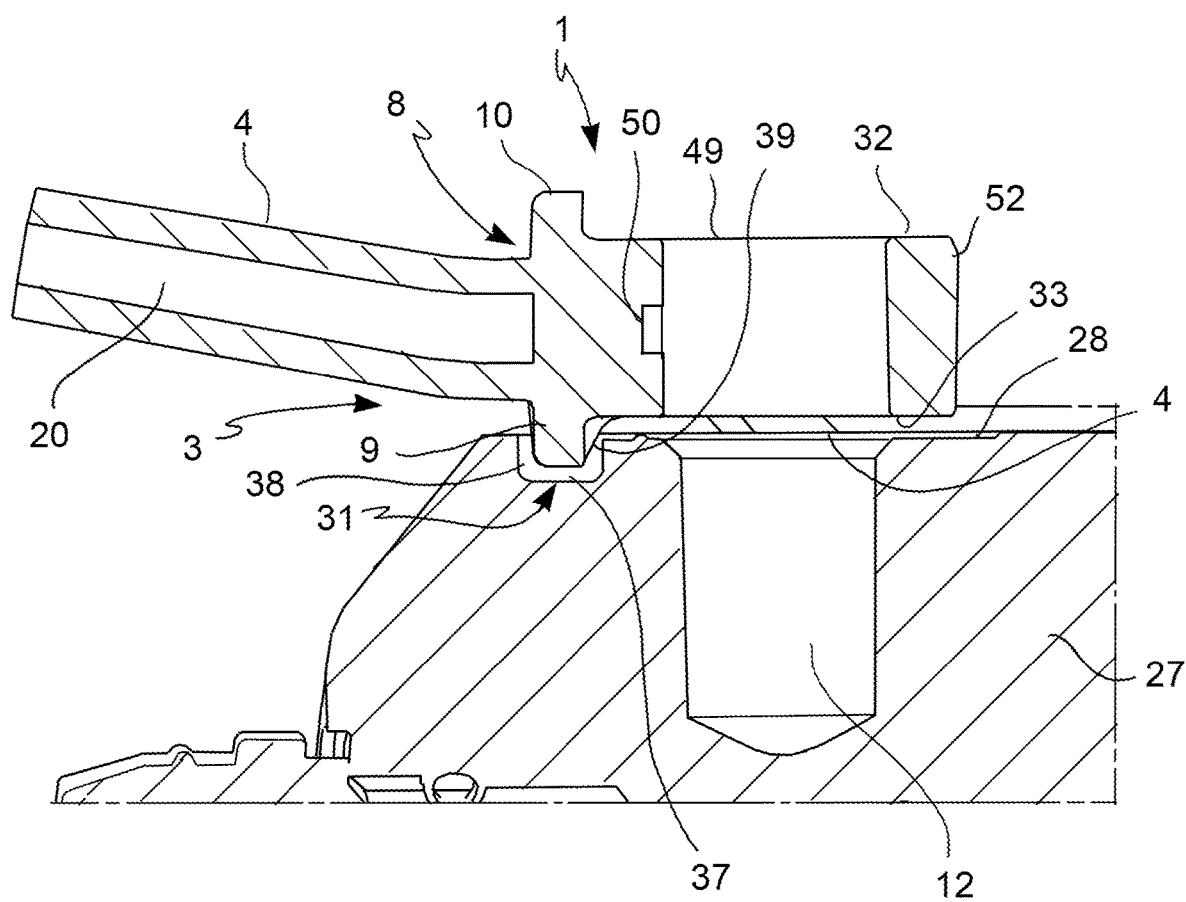
FIG. 7 is a section view of the detail in FIG. 6, from which some elements have been omitted.
Figure 8:
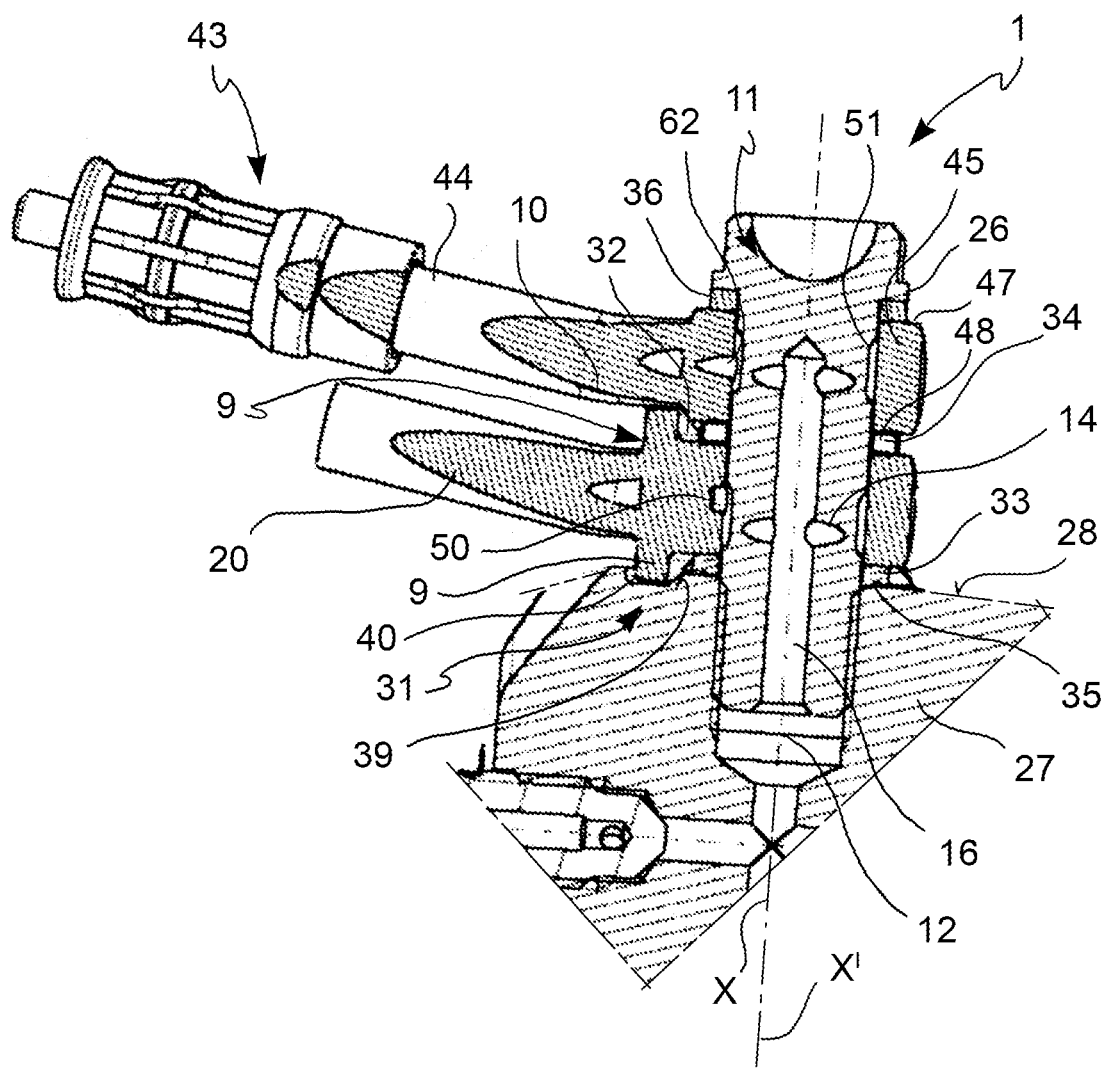
FIG. 8 is a section view of the detail in FIG. 6.
Figure 9:
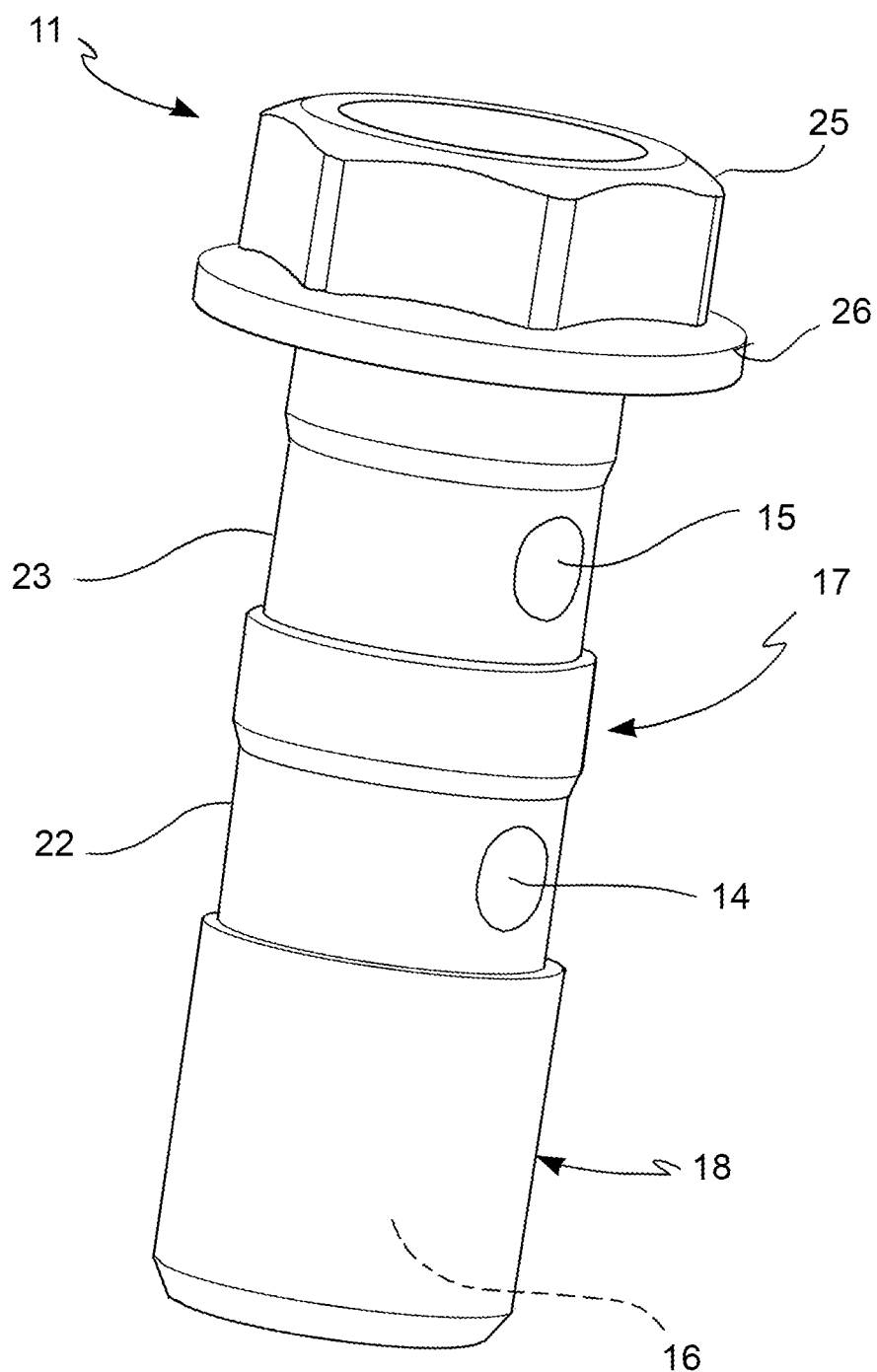
FIG. 9 is a union pipe according to a preferred embodiment of the present invention.

According to an embodiment, as shown in FIG. 7, the cavity 31 and said lower projection 9 are configured or sized so that, in the absence of said lower gasket 35, at least one escape route is formed between said eyelet lower sealing surface 33 and said hydraulic unit body base 28, through which said hydraulic liquid leaks.

According to an embodiment, in the absence of the lower gasket 35, the lower projection 9 abuts against the cavity bottom surface 37, preventing the eyelet lower sealing surface 33 from abutting against the hydraulic unit body base 28 and forming a gap 41 between the eyelet lower sealing surface 33 and the hydraulic unit body base 28, through which the hydraulic fluid leaks. Such a gap 41 is shown in FIG. 7.

According to an embodiment, the cavity 31 has an axial cavity depth, said lower projection 9 has an axial lower projection thickness and said lower gasket 35 has an axial lower gasket thickness, wherein said cavity depth, said lower projection thickness and said lower gasket thickness is measured parallel to the axial direction A-A.

According to an embodiment, the axial lower projection thickness is greater than said lower gasket axial thickness and said axial cavity depth.

According to an embodiment, said gap 41 has an axial gap thickness measured along a direction parallel to the axial direction A-A, wherein, in the absence of said lower gasket 35, when said connection 3 is connected to said hydraulic unit 2 by means of said pipe union 11, said axial gap thickness has dimensions similar to the axial lower gasket thickness measured along a direction parallel to the axial direction A-A.

Due to the mutual dimensioning of the cavity 31 and the lower projection, a hydraulic fluid leakage due to the absence of the lower gasket 35 can be detected when said connection is assembled to said hydraulic unit by means of said union pipe before the hydraulic assembly is sold or subsequently assembled on a vehicle. In particular, the gap 41 which is formed in the absence of the lower gasket 35 causes the eyelet lower sealing surface 33 not to be in contact with the base of the hydraulic unit body 28 and, therefore, there is no hydraulic seal between the two components 33, 28 and leakage of hydraulic fluid can be easily and evidently detected.

According to an embodiment, the shoulder 8 comprises an upper projection 10 which extends in an axial direction A-A, in a position diametrically opposite to said lower projection 9 by the side of said upper eyelet sealing surface 32, so as not to interfere with said upper gasket 34.

According to an embodiment, said eyelet 5 comprises an eyelet base 7 and an eyelet head 6, which are diametrically opposite, wherein said eyelet base 7 is arranged on the side of said feed pipe 4, wherein said shoulder 8 is obtained either on said eyelet base 7 or on said eyelet head 6.

According to an embodiment, said upper projection 10 and said pipe union head 21 are configured or sized so that, in the absence of said upper gasket 34, at least one escape route is formed between said eyelet upper sealing surface 32 and said pipe union head 21, through which said hydraulic fluid leaks.

According to an embodiment, said pipe union head 21 has a radial volume along the radial direction R-R which is such as to abut, at least partially, against said upper projection 10 in the absence of said upper gasket 34, so that said eyelet upper sealing surface 32 does not abut against said pipe union head 21.

According to an embodiment, the hydraulic assembly 1 comprises a second connection 43 presenting a second connection feed pipe 44 and a second connection eyelet 45.

The second feed pipe is adapted to receive a second input hydraulic fluid, and the second eyelet 45 delimits a second eyelet hole 46 which defines a second eyelet axis X' coincident with said eyelet axis X.

The second eyelet 45 comprises a second eyelet upper sealing surface 47 and a second eyelet lower sealing surface 48.

According to an embodiment, the second eyelet 45 is arranged coaxially to the eyelet hole 19 between the upper gasket 34 and the pipe union head 21.

According to an embodiment, the upper gasket 34 is arranged between the eyelet upper sealing surface 32 and the second eyelet lower sealing surface 48.

According to an embodiment, the hydraulic assembly 1 further comprises a second upper gasket 36 arranged between the second eyelet upper sealing surface 47 and the pipe union head 21.

According to an embodiment, said upper projection 10 and said second connection 43 are configured or sized so that, in the absence of said upper gasket 34, at least one escape route is formed between said eyelet upper sealing surface 32 and said second eyelet lower sealing surface 48, through which said hydraulic fluid leaks.

According to an embodiment, said pipe union 11 is further configured to receive said second fluid from said second eyelet 45 and send it into said delivery channel 12.

According to an embodiment, said union pipe 11 comprises at least one union pipe second radial duct 15 in fluid connection with said one union pipe axial duct 16.

According to an embodiment, the second eyelet 45 has a second eyelet inner side wall 51 on which a second eyelet opening 52 is formed from which the second connection inner feed channel 44 flows. The second eyelet opening 52 faces the union pipe second radial duct 15 to allow the fluid connection between the second feed pipe and the hydraulic unit body supply channel 12.

According to an embodiment, said union pipe second radial duct 15 is arranged in an axially higher position than said union pipe radial duct 14.

According to an embodiment, the union pipe 11 comprises a second union pipe circular crown 23 formed on the union pipe outer lateral wall onto which said second union pipe radial duct 15 flows. Said second circular crown 23 is formed as an indentation on the shank of the nozzle.

According to an embodiment, the second connection 43 has a radial volume in the radial direction R-R which is such as to abut, at least partially, against the upper projection 10 in the absence of the upper gasket 34, so that the eyelet upper sealing surface 32 does not abut against the second eyelet lower sealing surface 48.

According to an embodiment, shown in the figures, in the absence of said upper gasket 34, the upper projection 10 abuts against said second connection second feed pipe 44.

According to an embodiment, not shown, said upper projection 10 abuts against a second connection shoulder.

According to an embodiment, said hydraulic unit body base 28 comprises a flattening 30 adapted to house the lower gasket 35 at least partially.

Figure 4:
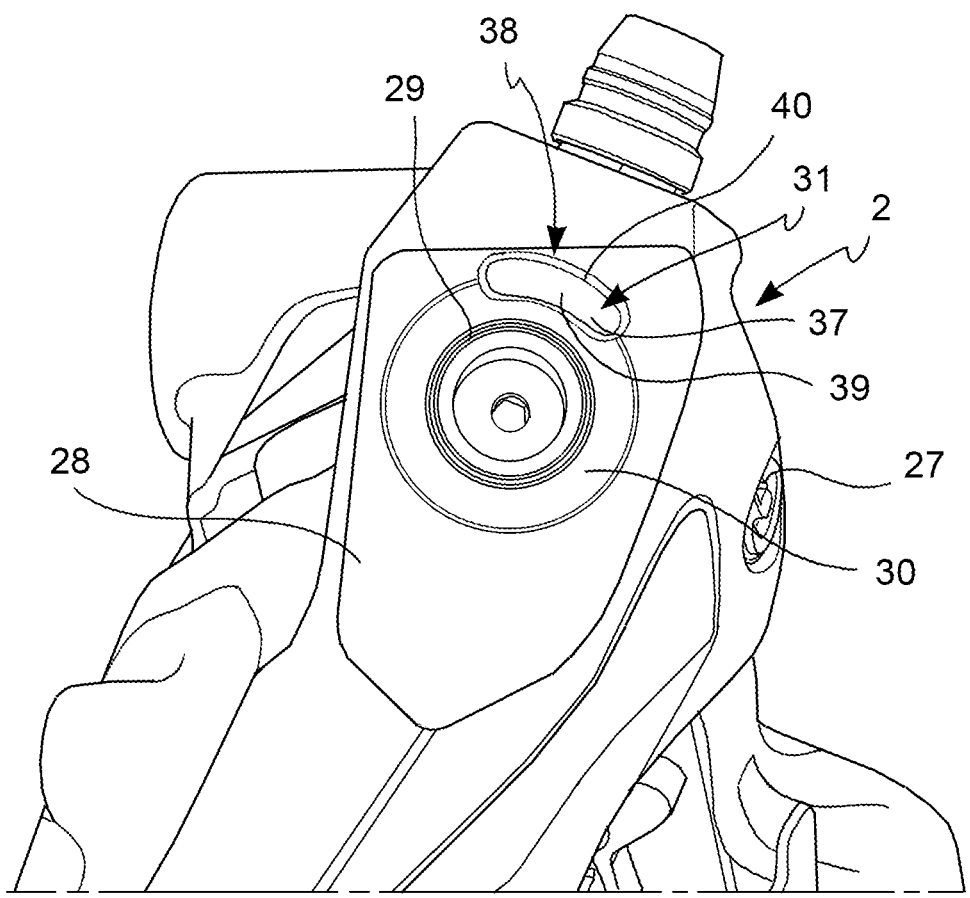
FIG. 4 is an axonometric view of a detail of a hydraulic unit of the hydraulic assembly according to the present invention.
Figure 5:
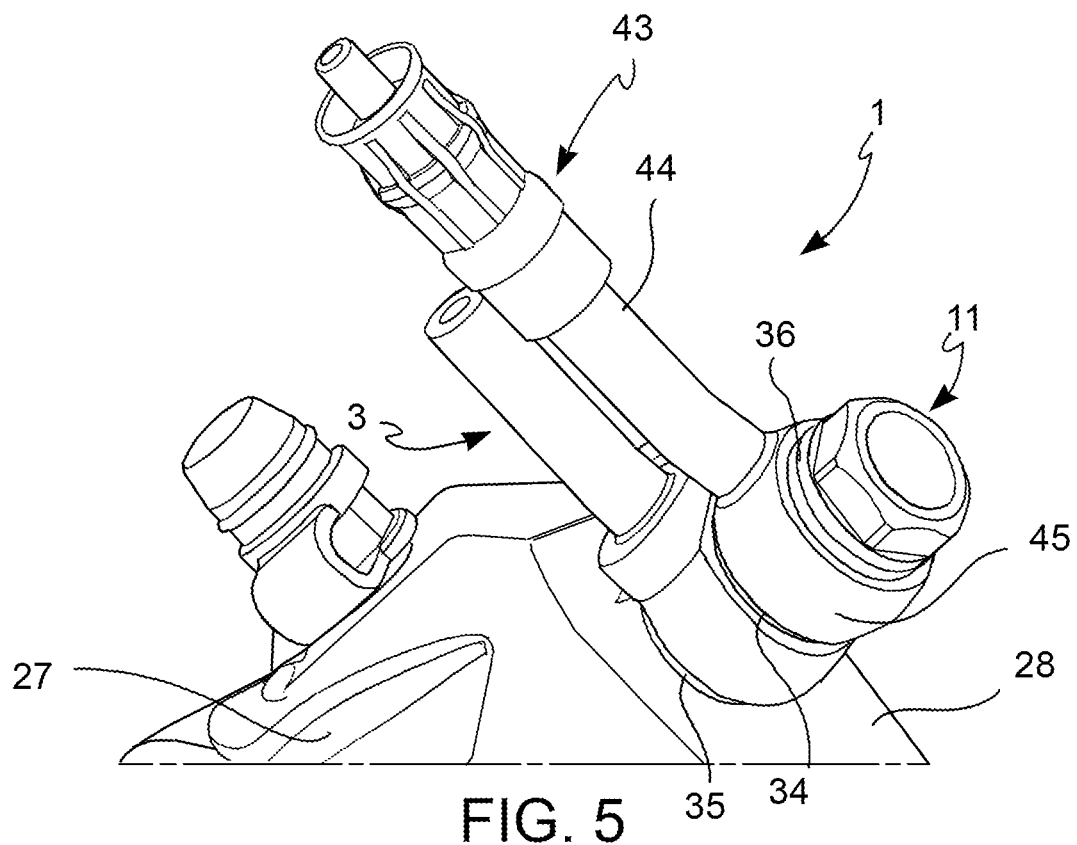
FIG. 5 is an axonometric view of a hydraulic unit according to the invention.
Figure 6:
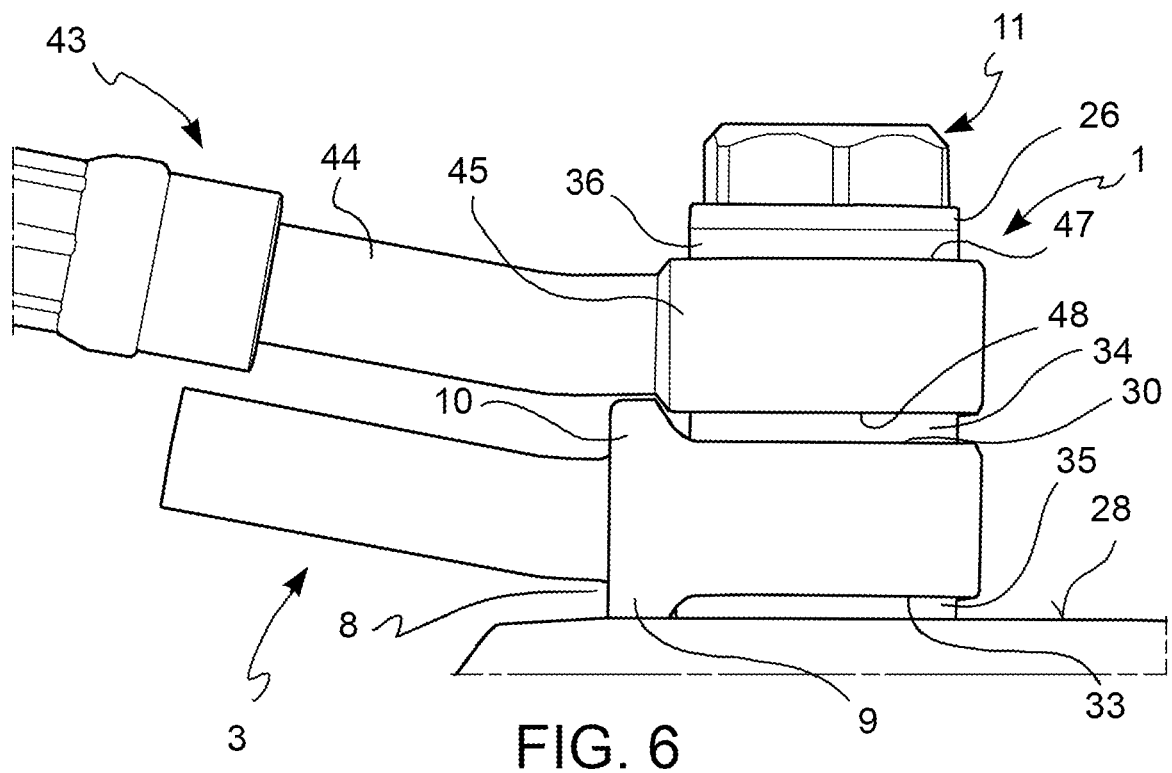
FIG. 6 shows a lateral view of a detail in FIG. 5.

According to an embodiment, said cavity 31 is provided at least partially radially outside said flattening 30, as shown in FIG. 4.

As can be appreciated from the description above, the present invention makes it possible to overcome the drawbacks presented in the prior art.

It is worth noting that the present invention is applicable relative to all hydraulic plants comprising hydraulic connections and hydraulic units, e.g. such as brake calipers, master cylinders, ABS control units, valves and the like.

Furthermore, the invention allows a safe, stable and fast assembly due to the arrangement on the connection of a lower projection and the hydraulic unit body base of a cavity so that with a single operation of inserting the projection into the cavity the stable position of the fail-safe connection is reached, which can thus be fixed to the hydraulic unit by means of the union pipe.

By virtue of the shape and to the mechanical interaction between the cavity and the lower projection, the invention makes it possible to prevent any rotation of the connection relative to the hydraulic unit, already during the assembly as soon as the lower projection and the cavity are coupled to each other.

The invention also makes it possible to detect the absence of at least the lower gasket by virtue of the mutual sizing of the lower projection and the cavity.

Therefore, the invention makes it possible to decrease the assembly time of hydraulic units, by virtue of the provision of elements which allow a positive coupling between the hydraulic connection and the hydraulic unit which is easy and intuitive to be implemented in existing assembly lines, and at the same time, the present invention makes it possible to reduce possible mutual positioning errors between hydraulic connections and hydraulic units, and consequently increase the production of correctly assembled hydraulic assemblies.

Moreover, the suggested invention is favorably applicable to hydraulic units having a plurality of hydraulic connection ports and a plurality of respective connections, wherein the stable position between the connection and the hydraulic connection port can be easily identified by virtue of the arrangements of the respective slots and the shapes of the respective projections.

A person skilled in the art can make numerous changes and variants to the embodiments described above, all contained within the scope of protection of the invention defined by the following claims to satisfy contingent, specific needs.

LIST OF REFERENCES 1 hydraulic assembly
2 hydraulic unit
3 connection
4 feed pipe
5 eyelet
6 eyelet head
7 eyelet base
8 shoulder
9 lower projection
10 upper projection
11 pipe union
12 hydraulic unit body delivery channel
13 pipe union cylindrical body
14 pipe union radial duct
15 union pipe second radial duct
16 union pipe axial duct
17 union pipe outer lateral wall
18 pipe union thread
19 eyelet
20 feed pipe inner channel
21 pipe union head
22 pipe union circular crown
23 union pipe second circular crown
26 head collar
27 hydraulic unit body
28 hydraulic unit body base
29 delivery channel inlet mouth
30 flattening
31 cavity
32 eyelet upper sealing surface
33 eyelet lower sealing surface
34 upper gasket
35 lower gasket
36 second upper gasket
37 cavity bottom surface
38 cavity lateral surface
39 radially inner portion
40 radially outer portion
41 gap
43 second connection
44 second feed pipe
45 second eyelet
46 second eyelet hole
47 second eyelet upper sealing surface
48 second eyelet lower sealing surface
49 eyelet inner lateral wall
50 eyelet opening
51 second eyelet inner lateral wall
52 second eyelet opening
X eyelet axis
X' second eyelet axis
A-A axial direction
R-R radial direction
C-C circumferential direction H band height

The invention claimed is:

1. A hydraulic assembly for braking systems and/or for actuating clutches, comprising:
a hydraulic unit having a hydraulic unit body, in which a delivery channel is formed, wherein said hydraulic unit body comprises a hydraulic unit body base, in which an inlet mouth of said delivery channel is formed;
said hydraulic assembly further comprising at least one connection comprising:
a feed pipe configured to receive a hydraulic fluid, and
an eyelet configured to output said hydraulic fluid, said eyelet delimiting an eyelet hole defining an eyelet axis (X-X) that defines an axial direction (A-A), a radial direction (R-R) perpendicular to said axial direction (A-A), and a circumferential direction (C-C) transversal to said axial direction (A-A) and to said radial direction (R-R), wherein said eyelet comprises an upper eyelet sealing surface and a lower eyelet sealing surface;
said hydraulic assembly further comprising:
at least one pipe union having a hollow cylindrical body and a pipe union head, wherein said hollow cylindrical body is configured to receive said hydraulic fluid from said eyelet and to introduce said hydraulic fluid into said delivery channel, wherein said pipe union is coaxially arranged to said eyelet hole,
at least one upper gasket arranged between said upper eyelet sealing surface and said pipe union head,
at least one lower gasket arranged between said lower eyelet sealing surface and said hydraulic unit body base;
wherein said at least one connection comprises a shoulder that extends sideways, at least in the radial direction (R-R), to said eyelet, wherein said shoulder comprises a lower projection that extends in the axial direction (A-A) by a side of said lower eyelet sealing surface not to interfere with said lower gasket;
and wherein said hydraulic unit body base comprises a cavity configured to accommodate said lower projection in a complementary manner, so that as soon as said lower projection and said cavity are coupled to each other said at least one connection is coupled to said hydraulic unit, preventing the hydraulic unit from rotating in the circumferential direction (C-C) during assembly and use.

2. The hydraulic assembly of claim 1, wherein said cavity comprises a cavity bottom surface and a cavity lateral surface, wherein said cavity lateral surface extends peripherally to said cavity bottom surface at least along said axial direction (A-A), wherein said lower projection abuts against said cavity bottom surface, and wherein at least one portion of said cavity lateral surface prevents said at least one connection from moving along said radial direction (R-R), and/or wherein said lower projection and said cavity have a shape coupling, so that when assembling said at least one connection to said hydraulic unit, a stable connection position is defined, both in the circumferential direction (C-C) and in the radial direction (R-R).

3. The hydraulic assembly of claim 2, wherein said cavity lateral surface comprises a radially inner cavity portion and a radially outer cavity portion, wherein said radially inner cavity portion is flared so as to direct said lower projection to said stable connection position in which said lower projection abuts against said radially outer cavity portion and said cavity bottom surface.

4. The hydraulic assembly of claim 2, wherein said cavity and said lower projection are configured or sized so that, in absence of said lower gasket, at least one escape route is formed between said lower eyelet sealing surface and said hydraulic unit body base, through which said hydraulic liquid leaks;
and wherein, in absence of said lower gasket, said lower projection abuts against the cavity bottom surface preventing said lower eyelet sealing surface from abutting against said hydraulic unit body base, forming a gap between said lower eyelet sealing surface and said hydraulic unit body base, through which said hydraulic fluid leaks.

5. The hydraulic assembly of claim 4, wherein said cavity has an axial cavity depth, said lower projection has an axial lower projection thickness and said lower gasket has an axial lower gasket thickness, wherein said axial cavity depth, said axial lower projection thickness and said axial lower gasket thickness are measured parallel to the axial direction (A-A), and wherein said axial lower projection thickness is greater than said axial lower gasket thickness and said axial cavity depth; and/or wherein said gap has an axial gap thickness measured along a direction parallel to the axial direction (A-A), wherein, in absence of said lower gasket, when said at least one connection is connected to said hydraulic unit by said pipe union, said axial gap thickness has dimensions similar to the axial lower gasket thickness measured along the direction parallel to the axial direction (A-A).

6. The hydraulic assembly of claim 1, wherein said shoulder comprises an upper projection that extends in the axial direction (A-A), diametrically opposite to said lower projection by a side of said upper eyelet sealing surface not to interfere with said upper gasket;
and/or wherein said eyelet comprises an eyelet base and an eyelet head, which are diametrically opposite, wherein said eyelet base is arranged on a side of said feed pipe, and wherein said shoulder is formed either on said eyelet base or said eyelet head.

7. The hydraulic assembly of claim 6, further comprising a second connection having a second feed pipe configured to receive a second hydraulic fluid, and a second eyelet delimiting a second eyelet hole that defines a second eyelet axis (X'-X') coinciding with said eyelet axis (X-X), wherein said second eyelet defines a second upper eyelet sealing surface and a second lower eyelet sealing surface,
wherein said second eyelet is coaxially arranged to said eyelet hole between said upper gasket and said pipe union head, wherein said upper gasket is arranged between said upper eyelet sealing surface and said second lower eyelet sealing surface, wherein said hydraulic assembly further comprises a second upper gasket arranged between said second upper eyelet sealing surface and said pipe union head, wherein said upper projection and said second connection are configured or sized so that, in absence of said upper gasket, at least one escape route is formed between said upper eyelet sealing surface and said second lower eyelet sealing surface, through which said second hydraulic liquid leaks,
and wherein said pipe union is further configured to receive said second hydraulic fluid from said second eyelet and send the second hydraulic fluid into said delivery channel, or wherein said upper projection and said pipe union head are configured or sized so that, in absence of said upper gasket, at least one escape route is formed between said upper eyelet sealing surface and said pipe union head, through which said hydraulic fluid leaks.

8. The hydraulic assembly of claim 7, wherein said pipe union head has a radial volume along the radial direction (R-R) so as to at least partially abut against said upper projection in absence of said upper gasket, so that said upper eyelet sealing surface does not abut against said pipe union head;
or wherein said second connection has a radial volume in the radial direction (R-R) so as to at least partially abut against said upper projection in absence of said upper gasket, so that said upper eyelet sealing surface does not abut against said second lower eyelet sealing surface.

9. The hydraulic assembly of claim 7, wherein said shoulder is obtained from a semi-finished product by at least one of turning, milling, forging, and wherein at least one of the following features applies:
said pipe union comprises at least one pipe union radial duct in fluid communication with said eyelet hole or with said second eyelet hole and a pipe union axial duct, wherein the pipe union axial duct is connected to the at least one pipe union radial duct and converges into the delivery channel;
said delivery channel is threaded, said pipe union comprises an outer lateral pipe union wall having a pipe union thread, and said delivery channel accommodates said pipe union thread.

10. The hydraulic assembly of claim 1, wherein said hydraulic unit body base comprises a flattening configured to at least partially accommodate the lower gasket, wherein said cavity is provided at least partially radially outside said flattening.

11. A hydraulic assembly for braking systems and/or for actuating clutches, comprising:
a hydraulic unit having a hydraulic unit body, in which a delivery channel is formed, wherein said hydraulic unit body comprises a hydraulic unit body base, in which an inlet mouth of said delivery channel is formed;
said hydraulic assembly further comprising at least one connection comprising:
a feed pipe configured to receive a hydraulic fluid, and
an eyelet configured to output said hydraulic fluid, said eyelet delimiting an eyelet hole defining an eyelet axis (X-X) that defines an axial direction (A-A), a radial direction (R-R) perpendicular to said axial direction (A-A), and a circumferential direction (C-C) transversal to said axial direction (A-A) and to said radial direction (R-R), wherein said eyelet comprises an upper eyelet sealing surface and a lower eyelet sealing surface;
said hydraulic assembly further comprising:
at least one pipe union having a hollow cylindrical body and a pipe union head, wherein said hollow cylindrical body is configured to receive said hydraulic fluid from said eyelet and to introduce said hydraulic fluid into said delivery channel, wherein said pipe union is coaxially arranged to said eyelet hole,
at least one upper gasket arranged between said upper eyelet sealing surface and said pipe union head,
at least one lower gasket arranged between said lower eyelet sealing surface and said hydraulic unit body base;
wherein said at least one connection comprises a shoulder that extends sideways, at least in the radial direction (R-R), to said eyelet, wherein said shoulder comprises a lower projection that extends in the axial direction (A-A) by a side of said lower eyelet sealing surface not to interfere with said lower gasket;
and wherein said hydraulic unit body base comprises a cavity configured to accommodate said lower projection in a complementary manner, so that said at least one connection is coupled to said hydraulic unit, preventing the hydraulic unit from rotating in the circumferential direction (C-C) during assembly and use;
wherein said shoulder comprises an upper projection that extends in the axial direction (A-A), diametrically opposite to said lower projection by a side of said upper eyelet sealing surface not to interfere with said upper gasket;

and/or wherein said eyelet comprises an eyelet base and an eyelet head, which are diametrically opposite, wherein said eyelet base is arranged on a side of said feed pipe, and wherein said shoulder is formed either on said eyelet base or said eyelet head.

\* \* \* \* \*